UNITED STATES PATENT OFFICE.

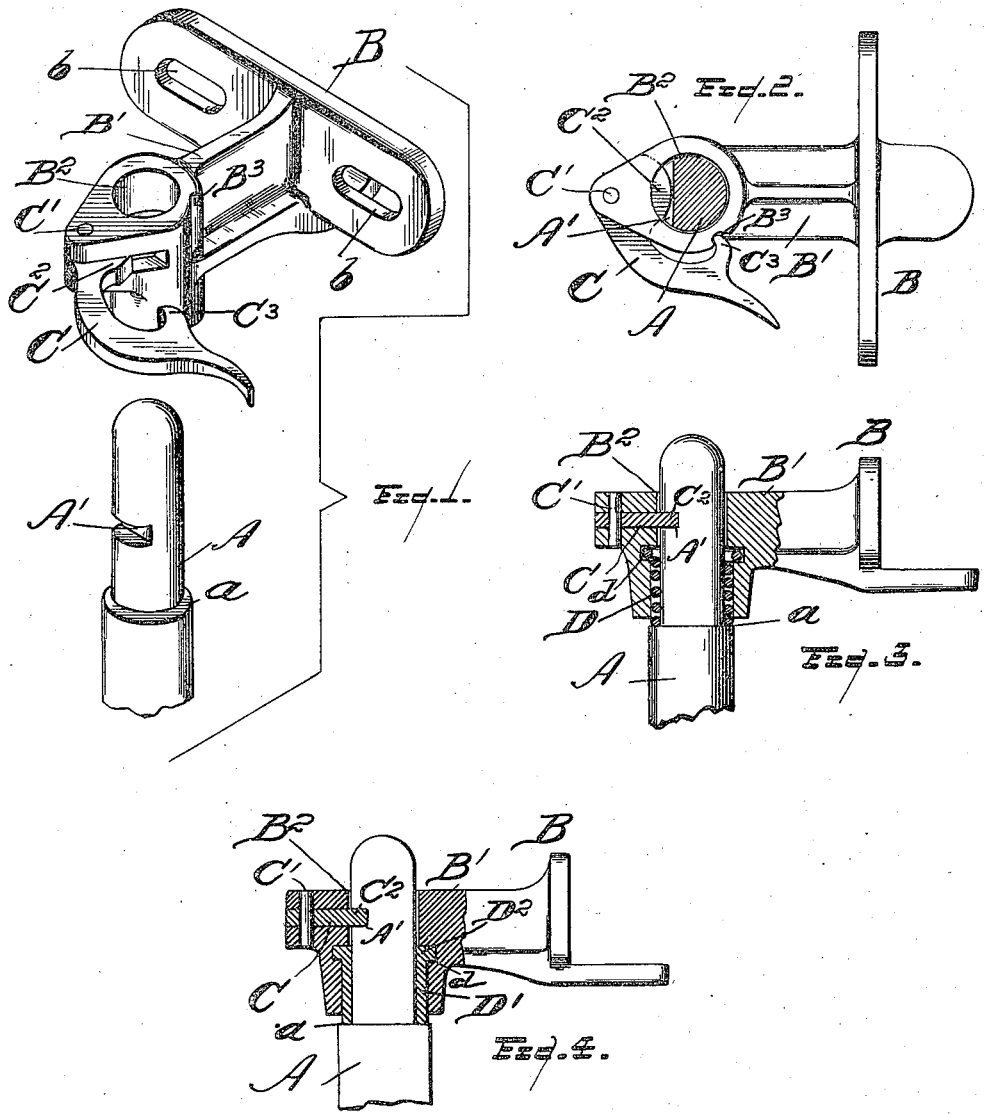

ALBERT E. BINDER, OF DETROIT, MICHIGAN.

LOCKING DEVICE FOR VEHICLE-TOPS.

1,204,735.

Specification of Letters Patent.   Patented Nov. 14, 1916.

Application filed February 26, 1916.   Serial No. 80,587.

*To all whom it may concern:*

Be it known that I, ALBERT E. BINDER, a citizen of the United States, residing at Detroit, county of Wayne, State of Michigan, have invented a certain new and useful Improvement in Locking Devices for Vehicle-Tops, and declare the following to be a full, clear, and exact description of the same, such as will enable others skilled in the art to which it pertains to make and use the same, reference being had to the accompanying drawings, which form a part of this specification.

My invention relates to a locking device for securing the forward end of an automobile top to the frame of a windshield, shown in the accompanying drawings and more particularly set forth in the following specification and claim.

This invention is designed as an improvement on the locking device for automobile tops, for which an application for patent was filed by me on the 24th day of April, 1915, and allowed on the 2nd day of November, 1915, Serial No. 23,550.

The object of the present invention is to provide means whereby play between the bracket secured to the frame of the automobile top and the windshield supporting standard is eliminated, thereby avoiding the noise and rattle which would otherwise result from the vibration of the vehicle.

Other advantages and improvements will hereafter appear.

In the drawings accompanying this specification:—Figure 1 is a perspective view of the device showing a fragment of a windshield supporting standard. Fig. 2 is a plan view of the device indicating the supporting standard in section with the swinging latch in its locked position. Fig. 3 is a vertical central section, with parts in elevation showing the spring housed within the bracket and the swinging latch engaged with the windshield supporting standard. Fig. 4 is a similar view showing a modification of the resilient element.

Referring now to the letters of reference placed upon the drawings:—A, indicates one of the supporting standards of a windshield frame.

B, denotes a bracket having a projecting arm B', provided with a socket B², at its outer end to receive the standard A, of the windshield frame, and with elongated slots $b$, for the passage of bolts to secure it to the forward bow of an automobile top.

C, indicates a swinging latch pivoted in the bracket at C', having a portion C², designed to enter the slot A', of the standard A.

C³, is a hook formed in the latch and adapted to enter the recess B³, formed in the wall of the projecting arm B', whereby the latch may be secured in its locked position.

D, denotes a helical spring housed in the socket B², of the bracket, and projecting below the latter in contact with the shoulder $a$, of the standard A;—the upper convolution of the spring being of relatively larger diameter and projecting into a recess $d$, to secure it against accidental dislodgement.

In the modification shown in Fig. 4, D', is a rubber thimble having a rim D², lodged in the recess $d$, of the bracket arm, to secure the thimble against dislodgment;—the lower edge projecting below the bracket arm in contact with the shoulder $a$, of the supporting standard.

Having indicated the several parts by reference letters, the construction and operation of the device will be readily understood.

A pair of the brackets D, are attached to the forward bow of the automobile top (not shown) and having been adjusted to register with the respective standards of the windshield frame, are engaged therewith by forcing the socket end of the brackets over the end of the standards. Upon registering with the slot in the standards, the latches are engaged therewith as indicated in Figs. 2 and 3 of the drawings. The spring, or the rubber thimble carried by the bracket arm, being under compression through contact with the shoulder of the standard, acts as a cushion and provides against rattle of the parts, which would otherwise occur due to the vibration of the car.

While the helical spring may be regarded by some as the preferred construction, the rubber thimble offers advantages not obtained by the spring, as it serves to cushion either a vertical or a lateral movement of the bracket with reference to the standard.

Having thus described my invention, what I claim is:—

In combination with the supporting standards of a windshield frame, a device of the character described comprising a bracket adapted to be secured to the bow of a vehicle top, having a socket portion to receive a windshield supporting standard, the wall of said socket portion being recessed to house a helical spring, a helical spring adapted to extend slightly below the bracket to bear against an abutment of the windshield supporting standard whereby play between the bracket and the standard is prevented, one of the convolutions of said spring being relatively larger in diameter and projecting into a recess formed in the socket portion of the bracket to secure the spring against accidental dislodgment, and means adapted to lock the bracket to the standard.

In testimony whereof, I sign this specification in the presence of two witnesses.

ALBERT E. BINDER.

Witnesses:
S. E. THOMAS,
J. L. DUFF.